(12) United States Patent
Bryar et al.

(10) Patent No.: US 8,132,094 B1
(45) Date of Patent: Mar. 6, 2012

(54) ELECTRONIC INPUT DEVICE AND METHOD FOR PROCESSING AN ELECTRONICALLY-EXECUTABLE INSTRUCTION IN AN ANNOTATION OF A DOCUMENT

(75) Inventors: Colin M. Bryar, Seattle, WA (US); Hilliard B. Siegel, Seattle, WA (US); Steven Kessel, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 343 days.

(21) Appl. No.: 12/432,657

(22) Filed: Apr. 29, 2009

Related U.S. Application Data

(63) Continuation of application No. 11/095,763, filed on Mar. 30, 2005, now Pat. No. 7,546,524.

(51) Int. Cl.
G06F 17/00 (2006.01)
(52) U.S. Cl. ...................................... 715/230
(58) Field of Classification Search .............. 715/229, 715/230, 268
See application file for complete search history.

(56) References Cited

U.S. PATENT DOCUMENTS

| | | | |
|---|---|---|---|
| 6,551,357 B1 | 4/2003 | Madduri | |
| 6,565,611 B1 | 5/2003 | Wilcox | |
| 6,671,684 B1 * | 12/2003 | Hull et al. ............... | 1/1 |
| 7,107,520 B2 | 9/2006 | Gargi | |
| 7,266,765 B2 | 9/2007 | Golovchinsky | |
| 7,568,151 B2 * | 7/2009 | Bargeron et al. .......... | 715/231 |
| 2001/0042098 A1 * | 11/2001 | Gupta et al. ............... | 709/206 |
| 2002/0052898 A1 | 5/2002 | Schilit | |
| 2004/0034832 A1 | 2/2004 | Taylor | |
| 2005/0060162 A1 * | 3/2005 | Mohit et al. ............... | 705/1 |
| 2005/0147299 A1 | 7/2005 | Wang | |
| 2005/0165747 A1 | 7/2005 | Bargeron | |

OTHER PUBLICATIONS

Cadiz, J.J., et al., "Using Web Annotations for Asynchronous Collaboration Around Documents," CSCW '00: Proceedings of the 2000 ACM Conference on Computer Supported Cooperative Work, Dec. 2000, pp. 309-318.

Electronic Ink product information, © 2002 E Ink Corporation, <http://www.eink.com/technology/index.html> [retrieved Aug. 25, 2004], 4 pages.

Guimbretiere, Francois,"Paper Augmented Digital Documents," UIST '03: Proceedings of the 16th Annual ACM Symposium on User Interface Software and Technology, Nov. 2003, pp. 51-60.

Hecht, D.L., "Printed Embedded Data Graphical User Interfaces," Computer 34(3):47-55, Mar. 2001.

(Continued)

*Primary Examiner* — Laurie Ries
(74) *Attorney, Agent, or Firm* — Lee & Hayes, PLLC

(57) ABSTRACT

An electronic input device such as an electronic pen is provided to annotate a document. The device may include a recording component that electronically records an annotation of the document, a recognition component that analyzes the annotation and determines whether the annotation includes an electronically-executable instruction, and a processing component that automatically causes an execution of the electronically-executable instruction when the annotation is determined to include an electronically-executable instruction. In another embodiment, a method for processing an annotation of a physical printed version of a document may include obtaining an electronic version of an annotation from a physical printed version of a document, determining if the annotation includes an electronically-executable instruction, and automatically causing an execution of the electronically-executable instruction if the annotation includes an electronically-executable instruction.

20 Claims, 9 Drawing Sheets

OTHER PUBLICATIONS

"How to Compute and Compare Hash Values by Using Visual C# .NET," © 2004 Microsoft Corporation <http://support.microsoft.com/default.aspx?scid=kb;en-us;307020> [retrieved Nov. 13, 2004], 5 pages.

"HP Forms Automation System," Hewlett-Packard Global Solutions Catalog, <http://www.hpgsc.com/cmssolutions/hpformsautomationsystem/index.cfm?solutionid=1188&SampleMode=display&CFID=6524361&C...> [retrieved Aug. 25, 2004], 3 pages.

Huang, G.T., "Microsoft's Magic Pen," Technology Review, May 2004, 3 pages.

netLibrary eBook Reader product information on Planet eBook Web site, © 1998-2002 Binary Thing Pty. Ltd., <http://web.archive.org/web/20030408112627/http://www.planetebook.com/mainpage.asp?...> [retrieved Jun. 13, 2006].

Price, M.N., et al., "Xlibris: The Active Reading Machine," Proceedings of Conference on Human Factors in Computing Systems (CHI98), Los Angeles, 1998, 2 pages.

Shontz, S.M., and S.A. Vavasis, "A Mesh Warping Algorithm Based on Weighted Laplacian Smoothing," Proceedings of the 12th International Meshing Roundtable, Sandia National Laboratories, Sep. 2003, pp. 147-158.

SmartPaper product information on Gyricon LLC's Web site, <http://www.gyricon.com/SmartPaper.asp> [retrieved Aug. 25, 2004], 2 pages.

Wearables: WDA, Pen, Comport, Web page, source unknown, available at least as early as Aug. 18, 2004, 1 page.

* cited by examiner

ELECTRONIC INPUT DEVICE AND METHOD FOR PROCESSING AN ELECTRONICALLY-EXECUTABLE INSTRUCTION IN AN ANNOTATION OF A DOCUMENT

CROSS-REFERENCE TO RELATED APPLICATION

This application is a continuation of U.S. patent application Ser. No. 11/095,763, filed Mar. 30, 2005, the entire disclosure of which is hereby incorporated by reference herein.

BACKGROUND

The present invention relates to systems and methods for processing annotations of a document. Traditionally, print media has been the only way to record information and ideas. Thus, when a person annotated a paper version of a document, the annotation could be replicated, for example, by rewriting the annotation in another copy of the document or by making copies of the annotated document. Presently, advancements in digital imaging allow persons to convert documents in printed form into digital form. When a person annotates a paper version of a document, a digital version of the document can be made by physically scanning the annotated document into a digital form.

There remains a need for better technology for automatically processing annotations of a document.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Embodiments of the invention described herein provide, for example, an electronic input device, a computer-implemented method, and computer-readable medium for use in annotating a document. In at least one embodiment, an electronic input device includes a recording component, a recognition component, and a processing component. The recording component is configured to electronically record an annotation of a document, while the recognition component is configured to analyze the annotation and determine whether the annotation includes an electronically-executable instruction. When the annotation is determined to include an electronically-executable instruction, the processing component is configured to automatically cause an execution of the instruction.

The electronic input device may be configured to locally execute the electronically-executable instruction. Alternatively, or in addition, the electronic input device may be configured to communicate the instruction to a separate device for remote execution. In some circumstances, the instruction may specify the separate device in a manner that the recognition component can identify the separate device.

Execution of the electronically-executable instruction may result in different actions. For example, without limitation, execution of the instruction may initiate a search of a digital version of the document for one or more words or for one or more annotations. In other examples, execution of the instruction may cause at least a portion of a digital version of the document to be printed or may cause an e-mail to be generated. In the latter case, a digital version of the annotated document may be attached to the e-mail.

The recognition component may be configured to recognize an electronically-executable instruction in the annotation based on one or more predefined characters in the annotation that indicate an electronically-executable instruction. In some circumstances, the document may be a physical paper document and the recording component is configured to electronically record an annotation of the physical paper document.

In at least one embodiment, a computer-implemented method for processing an annotation of a physical printed version of a document may be provided. The method may include obtaining an electronic version of an annotation from a physical printed version of a document; determining if the annotation includes an electronically-executable instruction; and automatically causing an execution of the electronically-executable instruction if the annotation includes an electronically-executable instruction.

In yet another embodiment, a computer-readable medium containing executable instructions may be provided. When executed by a computing apparatus, the executable instructions may cause the computing apparatus to obtain an electronic version of an annotation of a document from a physical printed version of the document; identify an electronically-executable instruction in the annotation; and automatically cause an execution of the electronically-executable instruction.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The invention is directed to methods and apparatus, such as an electronic input device, a computing system, and a computer-implemented method and medium for correlating an annotation on a paper version of a document with a digital version of the document. More specifically, an electronic input device is provided for recording an annotation on a paper version of a document and an image of human-comprehensible content that is sufficient to identify the document and possibly a location within the document. The human-comprehensible content may include words, letters, characters, pictures, etc., that convey meaning to a human reader of the document. Such content does not include unique identifiers such as barcodes, watermarks, or any other element comprised of symbols that are not comprehensible to a human. The human-comprehensible content and/or an image thereof are usable to locate a digital version of the document. The annotation is stored, and is associated with the digital version of the document if a digital version of the document is identified. In the case that the annotation is an instruction concerning the document or subject matter in the document, the instruction is recognized and executed. Further aspects of the invention can be used to augment the digital version of the document with the annotation. The combined result may be displayed, played back, or printed through an output device, for example, upon receiving a request from a user.

The following description first provides an overview of a computing system in which an exemplary embodiment of the invention may be implemented. Then a method for correlating an annotation on a paper version of a document with a digital version of the document is described. The following detailed description provides exemplary implementations of the invention. Although specific flow diagrams and system configurations are illustrated, it should be understood that the examples provided are not exhaustive and do not limit the invention to the precise form disclosed. Persons having ordinary skill in the field of computers and digital imaging will recognize process steps and structure described herein that may be interchangeable with other steps and structure, or combinations of steps or structures, and still achieve the benefits and advantages of the invention.

Figure 1:
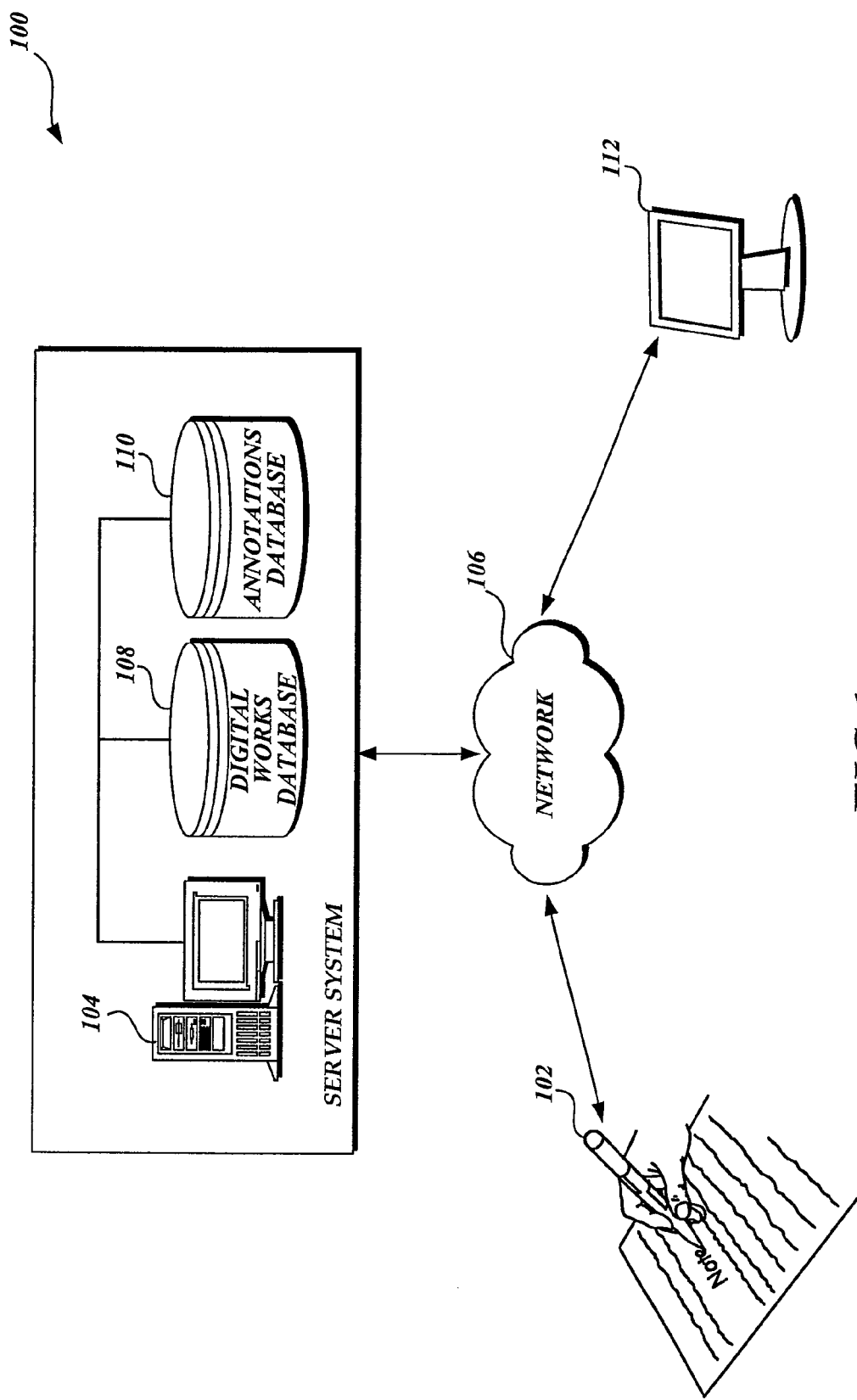
FIG. 1 is a pictorial diagram of a computing environment that includes an electronic input device, a server system, and an output device communicably connected through one or more networks.

To provide a context for describing embodiments of the invention, FIG. 1 illustrates a pictorial block diagram of a computing environment 100 that may be used to implement the invention. The computing environment 100 includes at least one electronic input device 102 and a computing system, such as a server system 104. The electronic input device 102 may communicate with the server system 104 through a network 106, using, for example, a wired or wireless connection, or may communicate directly with the server system 104 without an intervening network. As illustrated in FIG. 1, the server system 104 may be associated with a mass storage that contains a digital works database 108 and an annotations database 110. These two databases may be part of the server system 104; they may also be remotely located and communicatively connected to the server system 104.

As will be described with regard to the particular embodiments shown herein, the server system 104 is configured to communicate with the electronic input device 102. For example, the server system 104 may receive an annotation that was made on a paper version of a document and an image of human-comprehensible content in the document that is sufficient to identify the document and possibly a location in the document. In some cases, the electronic input device 102 processes the image of human-comprehensible content and generates data, such as a hash key or a digital signature. In other cases, the human-comprehensible content itself is used to identify a digital version of the document and possibly a location in the document. The electronic input device may, but is not required to, process the image of human-comprehensible content before sending it to the server system 104.

The server system 104 uses the data received to query the digital works database 108 for a digital version of the document that is being or has been annotated. The server system 104 stores the annotation in the annotations database 110, in association with a digital version of the document if a digital version of the document has been found. In circumstances where the server system 104 recognizes some or all of the annotation as constituting an instruction, the server system 104 also executes (or causes to be executed) the instruction portion of the annotation. As will be described later herein, in some embodiments of the invention, the digital version of the document may be augmented with the annotation. The resultant combination may be sent to an output device 112 through the network 106.

The output device 112 shown in FIG. 1 communicates with the server system 104 through the network 106. An output device 112 in communication with the server system 104 may include typical output devices, such as a computer display (e.g., CRT or LCD screen), a television, printer, facsimile machine, copy machine, etc. As noted above, the output device 112 can be used to display, play back, and/or print a digital version of a document augmented with an annotation provided to the server system 104 by the electronic input device 102.

Digital works may include any type of content that may be stored or distributed in digital form. By way of illustration, without limitation, digital works can include all forms of textual and graphical information, such as books, magazines, newspapers, newsletters, menus, guides, references, photographs, articles, reports, documents, etc., and all forms of audio and audio visual works such as music, multimedia presentations, audio books, movies, etc. Digital works may be stored as media files in the digital works database 108 that resides in or is otherwise communicatively connected to the server system 104.

An annotation can be any form of content that is associated with a document. It may include (but is not limited to) a critical commentary, an explanatory note, a summary of the document or some aspect of the document, a separate explanation of the same topic presented in the document, or a simple mark to highlight or emphasize something in the document. Annotations may be words, graphs, formulae, files, images, enhancements, markings, etc., provided by a user. For example, a user may wish to annotate a travel book by providing recent images of locations described in the travel book. A user may annotate a music sheet by commenting on the music, providing background information on the composer, alternative lyrics, technical information as to the composition, related musical compositions, etc. In a circumstance where the document is a cookbook, for example, a user may identify alternative ingredients that enhance a recipe, ingredients that make a spicier dish, ingredient substitutions considered to be lower in fat or carbohydrates, etc. In another circumstance, a user such as a student or teacher may provide a markup of an academic textbook. As can be appreciated from the foregoing, there is virtually no limitation to the type, form, and content of annotations that can be added to a digital work. By way of illustration, an annotation can also be in the form of a link or address to another page, file, or document available to the server system 104 or other computing system.

In embodiments of the invention, an annotation can also be an instruction concerning the document or subject matter in the document. For example, an annotation can be a command to look up a certain word in the document, to print the document, to check existing commentaries concerning the content of the document, to print a picture of a selected object in the document, etc. An annotation can also be a command to route the annotated document to a specified location, to generate a notification to be sent to a mail list to notify members on the mail list, for example, that the document has new annotation(s), etc. An annotation can further be a command to execute an action on a remote system. For example, an annotation can be a command to generate an e-mail in a remote server; the e-mail attaches the annotated document. In circumstances where the annotation is written, a character recognition routine, such as OCR, may be applied to the annotation; and if one or more characters or words in the annotation indicate an executable instruction, the instruction can then be carried out. The execution of the instruction may occur locally on the electronic input device, remotely on the server where the annotation is sent, or remotely on another computing system that is specified in the instruction.

The computing environment 100 illustrated in FIG. 1 has an annotations database 110 residing in or otherwise communicatively connected to the server system 104, though in other computing environments, the computing systems may be arranged differently. Annotations that are stored in the annotations database 110 may be associated with the digital works stored in the digital works database 108. The network 106 shown in FIG. 1 may be a local area network (LAN) or a larger network, such as a wide area network (WAN), a collection of networks, or the Internet. Wired or wireless network connections may be used with any suitable communication protocols, such as TCP/IP. As will be appreciated by those skilled in the art and others, FIG. 1 provides a simplified example of one suitable computing environment for implementing embodiments of the invention, and is not limited thereto.

When software and hardware formed in accordance with the invention is implemented in one or more input devices and computing systems of the type illustrated in FIG. 1, for example, the devices and systems provide a way for users to annotate a paper version of a document such that the annotation can be automatically associated with a digital version of the document. In embodiments of the invention, the devices and systems may also provide a way for augmenting the digital version of the document with the annotation and present the augmented document for further use. Allowing an annotation on a paper version of a document to be associated with a digital version of the document and/or providing a mechanism for augmenting a digital version of a document with an annotation can make the underlying digital work more useful and valuable. For example, upon request, the digital version of the document can be printed along with the annotation.

Figure 2:
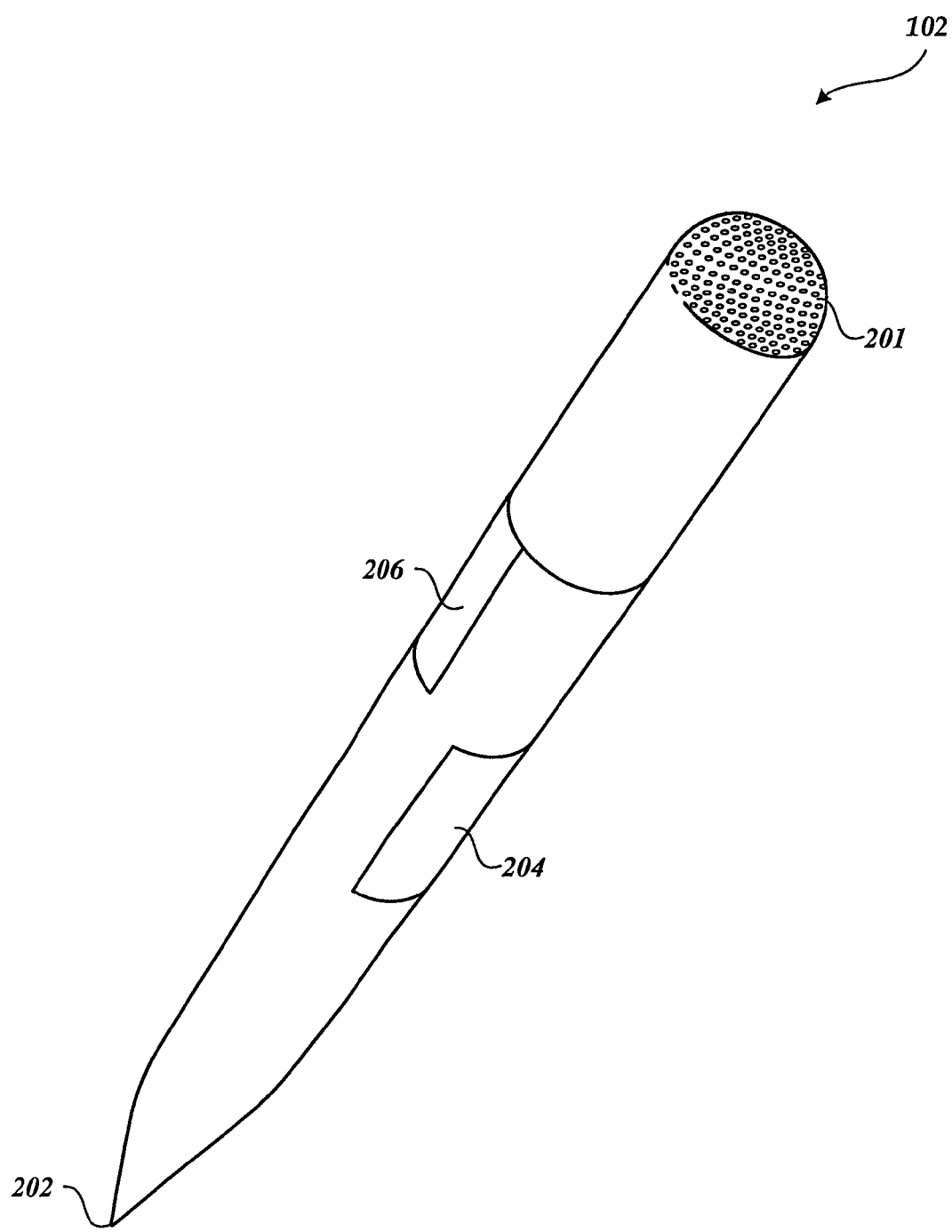
FIG. 2 is a depiction of an exemplary embodiment of an electronic input device that may be used in the computing environment of FIG. 1.

FIG. 2 provides one exemplary implementation of an electronic input device 102 that can be used to correlate an annotation on a paper version of a document with a digital version of the document. The electronic input device contains a recording component that enables a user to annotate a document. In some embodiments of the invention, the recording component is an audio device 201. When the audio device 201 is turned on, a user may dictate an annotation, which will be recorded in the audio device 201. In other embodiments of the invention, the recording component is a writing tip 202 for a user to annotate a document. The writing tip 202 may include a sensor, having a capacity to record the movements of the writing tip 202. The electronic input device 102 may further include an ink deposit. In some embodiments, the electronic input device 102 contains a switch that enables or disables the flow of ink from the ink deposit through the writing tip 202. The switch, for example, may control a valve or other mechanism that can open and close a channel through which ink from the ink deposit may flow.

In embodiments that include a sensor with the writing tip 202, the sensor captures the annotation by recording the movements of the writing tip 202. Any form or type of sensor may be used to record the movements of the writing tip 202. Some examples, without limitation, include: a solid state gyro that is configured to detect and report motion of the writing tip 202, e.g., in the X-Y plane, as the writing tip moves across the document being annotated; a roller ball that detects and reports motion of the writing tip 202, e.g., in a manner similar to a roller ball in a conventional computer mouse; an RF signal that emanates from the electronic input device 102 from which the relative motion of the writing tip 202 can be determined; or a digitizer positioned around or under the document page being annotated. At its simplest, the sensor needs only to detect and to provide signals reflecting the relative motion of the writing tip 202 as it moves across the document being annotated.

The electronic input device 102 may further contain an imaging component 204 for obtaining an image of human-comprehensible content in the document that is sufficient to identify the document and possibly a location in the document. The imaging component 204 may be any device that has image recording capabilities. For example, the imaging component 204 can be a digital camera, a scanning device, etc. The imaging component may be configured to record a single image, or record a series of images, that capture human-comprehensible content in the document. The human-comprehensible content is preferably adjacent to or spatially near the annotation, though embodiments of the inventions may be configured to operate using human-comprehensible content located anywhere in the document. As will be understood below, the human-comprehensible content is used to identify the digital version of the document that is being or has been annotated. Where the human-comprehensible content is adjacent to or spatially near (including under) the annotation, the content can be used to identify the location in the digital version of the document where the annotation is found in the printed version of the document. The imaging component can also be used to record the annotation itself.

Finally, the electronic input device 102 includes a data communication component 206 through which the electronic input device 102 communicates with a computing system, such as the server system 104 depicted in FIG. 1. The data communication component 206 is used to upload the data and information recorded by the imaging component 204 and by the recording component, which can be the audio device 201 and/or the writing tip 202.

If desired, the electronic input device 102 records and transmits information while the user is annotating. In other embodiments, the electronic input device records and transmits information after the annotation has been completed. The data communication component 206 hosts a wired or wireless connection unit through which the electronic input device 102 communicates.

In some embodiments of the invention, the electronic input device 102 includes a processor that processes human-comprehensible content to generate data such as a hash value or a digital signature concerning the human-comprehensible content as will be described in greater detail herein. Such data is then transmitted to a computing system, such as the server system 104 illustrated in FIGS. 1 and 3.

In some embodiments of the invention, the electronic input device 102 may be associated with a docking station. In such embodiments, the electronic input device 102 captures and stores data, such as annotations and images of human-comprehensible content in a document that is sufficient to identify the document and possibly a location in the document. The electronic input device 102 communicates the annotations and images of the human-comprehensible content to a computing system, such as the server system 104 illustrated in FIGS. 1 and 3, when the electronic input device 102 is docked in the docking station.

Figure 3:
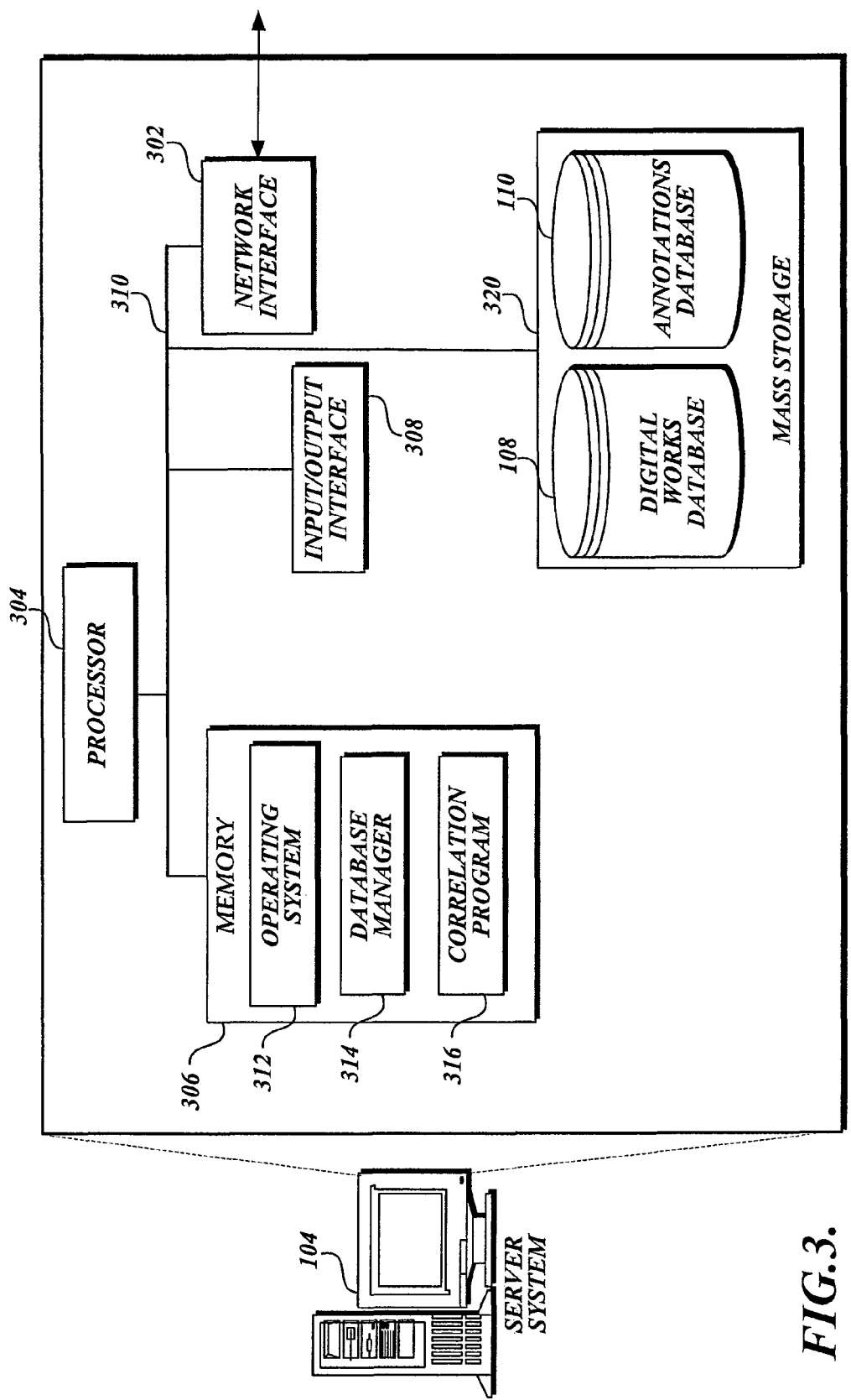
FIG. 3 is a schematic block diagram of an exemplary embodiment of a server system that may be used in the computing environment of FIG. 1.

FIG. 3 depicts an exemplary computer architecture for the server system 104 illustrated in FIG. 1, suitable for use in implementing embodiments of the invention. The server system 104 connects to the network 106 (FIG. 1) using a network interface 302. The network interface 302 includes the necessary hardware and software to allow the server system 104 to communicate with other computing devices connected to the network 106 by use of one or more suitable communication protocols, such as TCP/IP protocol.

The server system 104 further includes a processor 304, memory 306, and an input/output interface 308, all communicatively connected together and to the network interface 302 by a communication bus 310. The processor 304 is configured to operate in accordance with computer program instructions stored in a memory, such as the memory 306. Program instructions may also be embodied in a hardware format, such as a programmed digital signal processor.

The memory 306 may be comprised of any type of storage facility, and may include, by way of example, RAM, ROM, and/or removable computer-readable media. The memory 306 may store an operating system 312 for controlling the operation of the server system 104. The operating system 312 may be a general-purpose operating system such as a Microsoft server operating system, UNIX, or LINUX, for example.

The memory 306 additionally stores program code and data that provide a database manager 314 and a correlation program 316. The correlation program 316 comprises computer-executable instructions that, when executed by the processor 304, cause the server system 104 to correlate an annotation on a paper version of a document with a digital version of the document. The correlation program 316 receives the annotation from an electronic input device such as the electronic input device 102 illustrated in FIGS. 1 and 2 through the input/output interface 308. The correlation program 316 may also cause the server system 104 to augment the digital version of the document with the annotation and output the resultant combination to an output device 112 through the input/output interface 308. Furthermore, the memory 306 may be configured to store digital images of content and data for processing, transmission, and display in accordance with the invention.

In this particular embodiment, the server system 104 further includes a mass storage 320 comprising facilities such as one or more CD-RW/DVD-RW drives, hard disk drives, tape drives, etc., or combinations thereof, that are utilized to store databases. In the embodiment shown in FIG. 3, the mass storage 320 contains the digital works database 108 and the annotations database 110. The database manager 314 in the memory 306 can be used to facilitate the storage and retrieval of information in the digital works database 108 and the annotations database 110.

For ease of illustration, FIG. 3 does not show other typical components of a computing system, such as a video display adapter, power supply, computer monitor, etc. However, those having ordinary skill in the art of computers will recognize a wide selection of commercially-available components that can be used to construct and operate a computing system such as the server system 104 illustrated in FIG. 3.

As noted above, the server system 104 may receive data concerning an annotation on a paper version of a document from an electronic input device, such as the electronic input device 102 illustrated in FIGS. 1 and 2. The annotation is stored in the annotations database 110, and may be stored in association with a digital version of the document if a digital version of the document is found. Storing an annotation in association with a digital version of the document may be accomplished in any suitable manner. Such a manner can be, for example, simply storing the annotation in the annotations database 110 with an indication of the digital work to which the annotation pertains, and if appropriate, the location(s) within the digital work to which the annotation pertains.

Figure 4:
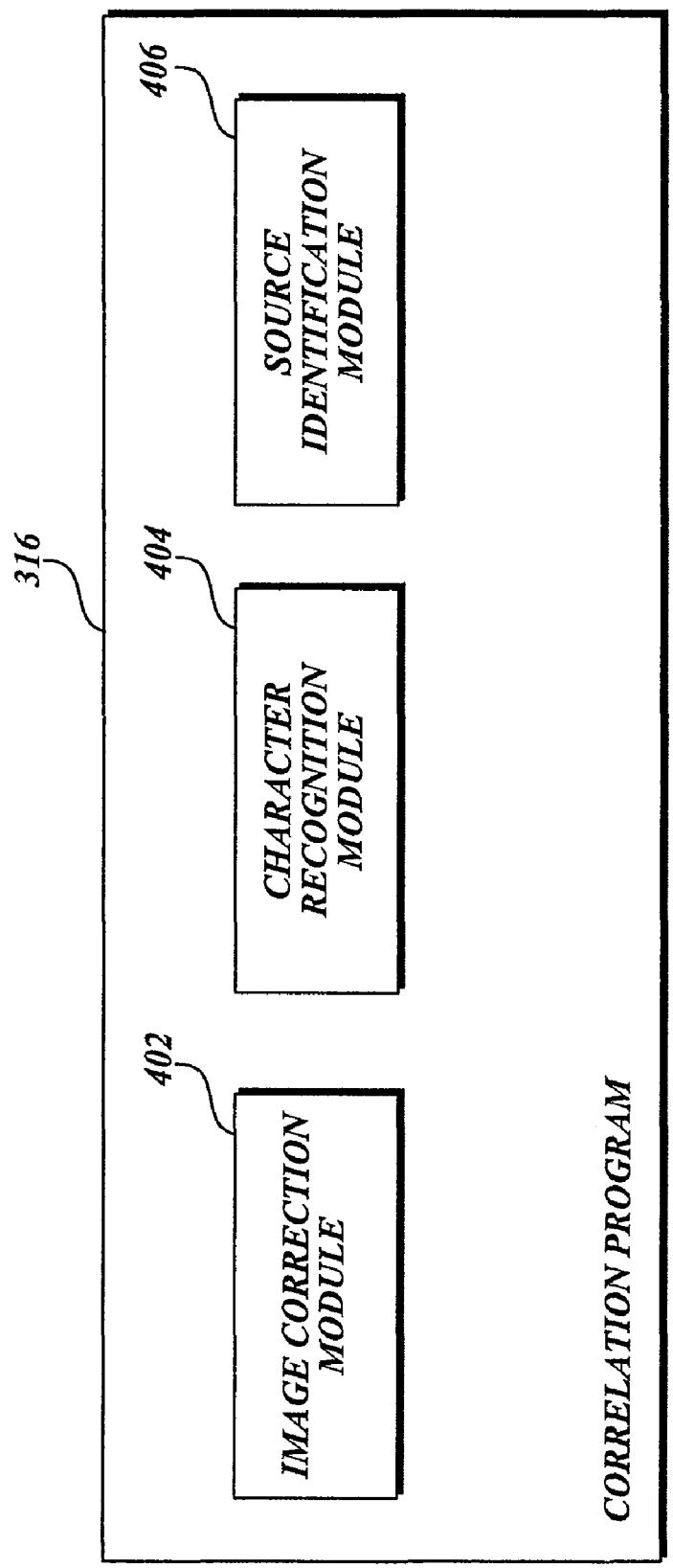
FIG. 4 is a functional block diagram of a correlation program that may be used in the server system of FIG. 3.

FIG. 4 provides a functional block diagram of one exemplary implementation of the correlation program 316 illustrated in FIG. 3. As noted above, the correlation program 316 receives information about an annotation of a document and searches to locate a digital version of the document in the digital works database 108. If a digital version of the document is found, the correlation program 316 saves the annotation in the annotations database 110 in association with the digital version of the document. If the digital version of the document is not found, the correlation program 316 still saves the annotation in the annotations database 110, expecting a digital version of the document can be automatically or manually identified at a later time. In some embodiments of the invention, the correlation program 316 is further capable of augmenting the digital version of the document with the annotation and providing the resultant combination for display, playback, and/or printing to an output device such as the output device 112 illustrated in FIG. 1.

FIG. 4 specifically illustrates exemplary components that may be included in a correlation program 316. These components include an image correction module 402, a character recognition module 404, and a source identification module 406. Collectively, the components of the correlation program 316 can be used to correlate an annotation on a paper version of a document with a digital version of the document.

As described above with respect to FIGS. 1 and 2, the electronic input device 102 records an annotation and an image of human-comprehensible content in a document (hereinafter "comprehensible content") that is sufficient to identify the document and possibly a location in the document. The comprehensible content may include words, letters, characters, pictures, etc. that convey meaning to a human reader of the document. Such content does not include identifiers, such as bar codes, watermarks, cross hatches, etc., that are not comprehensible to a human, even though they can be used by a machine to uniquely identify a document. Embodiments of the invention can be configured to use the comprehensible content and possibly spatial relationships among the comprehensible content to locate the digital version of the document, as will be discussed later below in regard to FIG. 5C.

In some embodiments of the invention, the electronic input device 102 may record and transmit an annotation and an image of comprehensible content in a document before, during, or after the time in which the document is annotated. If the data contains an image of the annotation and/or comprehensible content in the document, upon receiving the image, the image correction module 402 may be engaged to reduce or eliminate distortions, if any, in the image. Any of a variety of known methods for image correction may be used in conjunction with the invention. For example, the image correction module 402 may be comprised of one or more image correction applications such as a perspective skew correction application, a rotational skew correction application, and a movement stabilization application. Individually or collectively the applications comprising the image correction module 402 can operate to reduce or eliminate distortions in images so that a character recognition application may better identify comprehensible content, including text, in the corrected image.

One example of a perspective skew correction application calculates the perspective skew angles of images and adjusts the images to reduce or eliminate perspective skew. The angles of perspective skew can be calculated by analyzing one or more indictors that exist in the images of printed content. For example, a linear indicator of the skew angles is the predominant direction of white space on a page. Typically, white space exists between successive lines of text and the orientation of a page in relation to an input device may be derived by calculating the prevailing direction of white space. This linear indicator and other indicators such as the prevailing direction of character strings, orientation of geometric shapes and page edges, and the orientation of individual characters may all be used, individually or collectively, to determine the perspective skew angles of a page image.

After the perspective skew angles are calculated, a perspective skew correction application can adjust the images to reduce or eliminate perspective skew. More specifically, the perspective skew correction application can map pixels from a source image to a destination image based on a mapping function that eliminates perspective skew. The source image may be mapped to a destination image with a technique known as mesh warping transformation. Generally described, mesh-warping transformation applies two-dimensional geometric transformations to reshape geometric alignments. In order to reshape geometric alignments, a correspondence is established between feature primitives, e.g., curves, line segments, and points. Each feature primitive specifies an image feature or landmark. The correspondence between feature primitives and the perspective skew angles is then used to compute a mapping function that defines the change in each pixel's location between the source and destination images. Applying the mapping function to the source image produces a destination image free from perspective skew. One algorithm for performing a mesh warping transformation that may be used in conjunction with the present invention to eliminate perspective skew may be found in "A Mesh Warping Algorithm Based on Weighted Lapacian Smoothing," by Suzanne Shontz and Stephen Vavasis, in *Proceedings of the 12th International Meshing Roundtable*, Sandia National Laboratories, September 2003, pp. 147-158.

Rotational skew refers to distortion in an image when text follows a curved path out of alignment with an associated line of text. Rotational skew in a page image is common when text is located near a binding. A rotational skew correction application can determine if an image contains text that is rotationally skewed and perform adjustments to reduce or eliminate the skew. To determine if rotational skew exists, one embodiment of a rotational skew correction application analyzes lines of text and determines the predominant direction of the text. Text that is out of alignment with the predominant direction and follows a curved path is identified as being rotationally skewed. Similar to the perspective skew correction application described above, the rotational skew correction application may use a technique of mesh warping transformation to produce an image that is not rotationally skewed. However, the mapping function that corrects rotational skew generally uses different parameters than the mapping function that corrects perspective skew. For example, the mapping function generated by the rotational skew correction application determines the amount that text is rotationally skewed (i.e., rotational variance). Then a correspondence is established between feature primitives. The correspondence between feature primitives and the rotational variance are then used to calculate the mapping function that corrects rotational skew. One algorithm for performing a mesh warping transformation that may be used in conjunction with the present invention to eliminate rotational skew may be found in "A Mesh Warping Algorithm Based on Weighted Lapacian Smoothing," by Suzanne Shontz and Stephen Vavasis, referenced above.

The imaging component 204 of the electronic input device described above may capture one or more images of the document with text that is distorted or blurred due to movement. A movement stabilization application can adjust an image to reduce or eliminate this type of distortion. More specifically, a movement stabilization application can identify character edges in images by identifying pairs of adjacent pixels that have a predetermined difference in brightness. The brightness of each pixel along an edge is then exaggerated so that dark pixels are darkened and light pixels are lightened. The result is to increase the contrast between neighboring pixels and create characters with visually perceptible edges.

It should be well understood that the image correction module 402 may implement other techniques for correcting images that are generally known in the art. For example, character recognition applications often have difficulty recognizing text in images with heavy noise (i.e., grainy or heavily pixilated images). The image correction module 402 may reduce the amount of noise in an image by adjusting pixels that are not associated with text in the image.

The character recognition module 404 operates on the image to identify comprehensible content, such as text, in the image. Where suitable, the character recognition module 404 may translates images of characters using a standard encoding scheme (such as ASCII or Unicode) to digitally represent the characters in an image. These standard encoding schemes specify a correspondence between digital bit patterns and symbols of a written language, thus allowing a computer to process, store, and communicate character-oriented information. In embodiments of the invention, the term "character recognition" refers to all forms of optical character recognition (using optical techniques such as mirrors and lenses) and digital character recognition (using scanners and computer algorithms). Since very few applications remain that use true optical techniques, the term OCR as used herein includes all forms of optical and digital character recognition.

In this particular embodiment, text that is identified by the character recognition module 404 may constitute comprehensible content in the document that is usable to locate the digital version of the document. As will be described below, the source identification module 406 is then engaged to query the digital works database 108 to identify a digital version of the document that is being or has been annotated. The source identification module 406 may also determine the location in the digital version of the document that corresponds to the location of the annotation in the paper version of the document.

Finally, the correlation program 316 works in conjunction with the database manager 314 to store the annotation in the annotations database 110, preferably identifying the location at which the annotation should appear in the digital work. In some embodiments of the invention, the correlation program 316 may further be employed to augment the digital work with the annotation and provide the augmented digital work for display, play back, and/or printing to an output device, such as the output device 112 illustrated in FIG. 1.

Figure 5A:
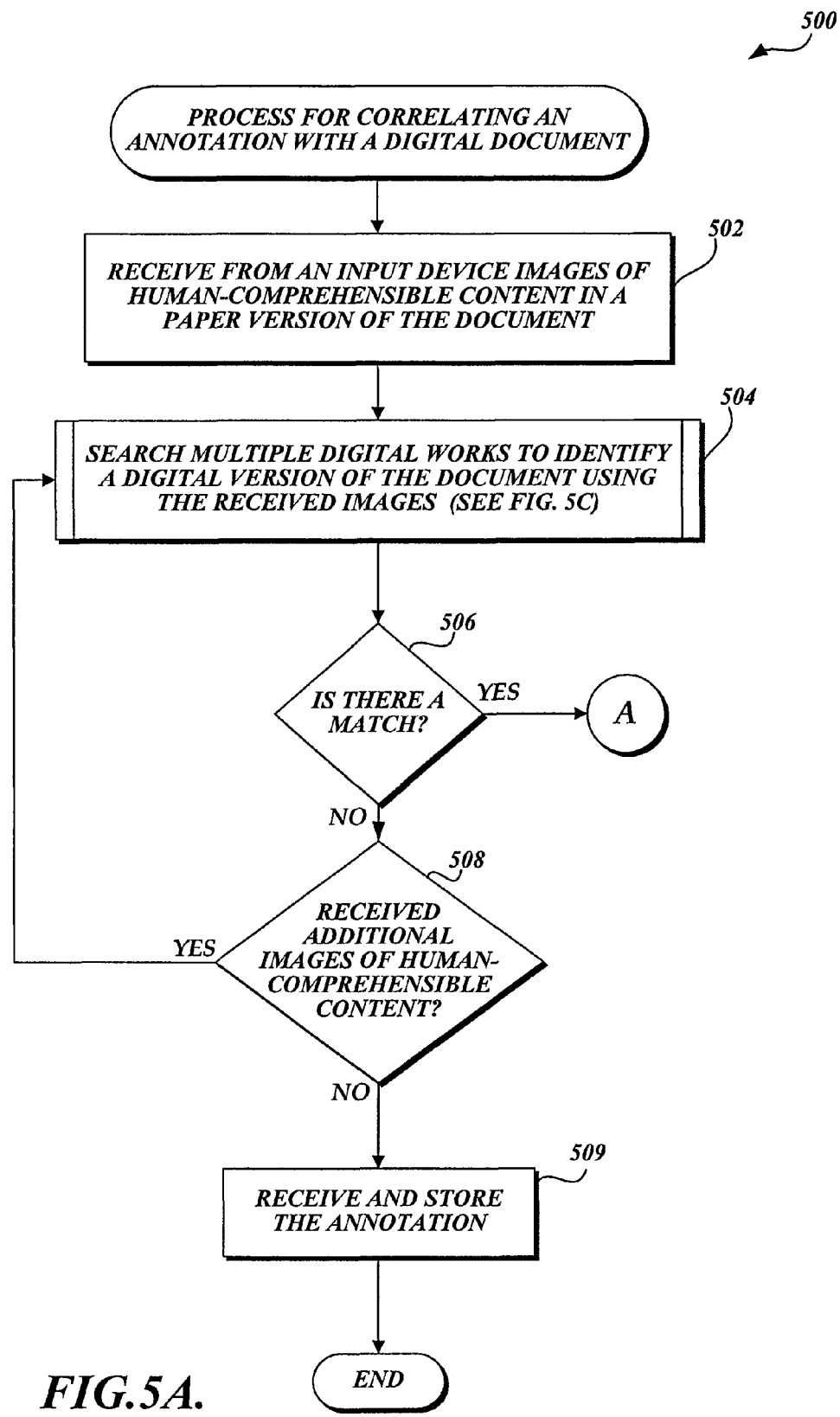
FIGS. 5A-5C are flow diagrams illustrating an exemplary implementation of a process for correlating an annotation of a paper document with a digital document.
Figure 5B:
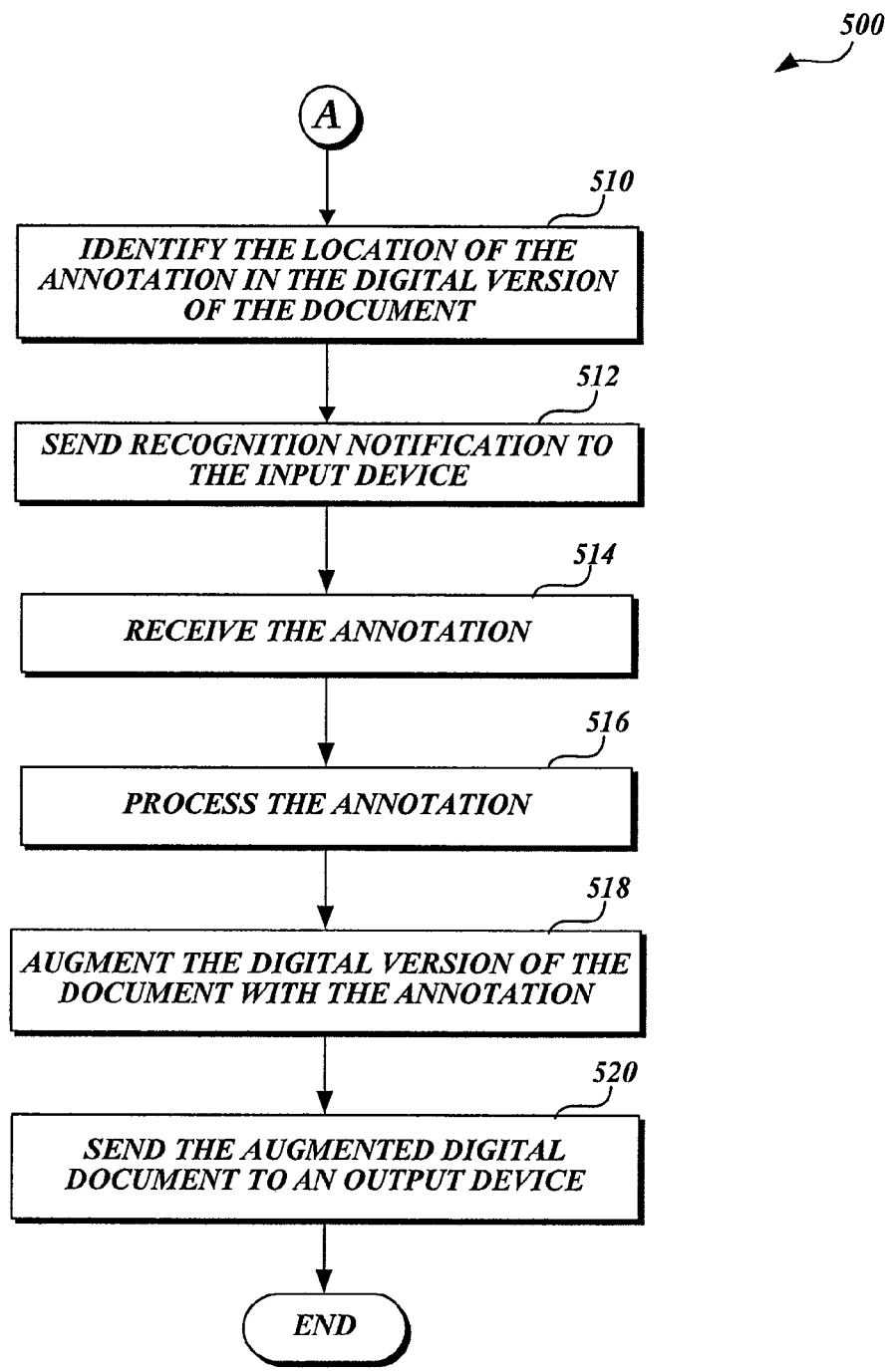
Figure 5C:
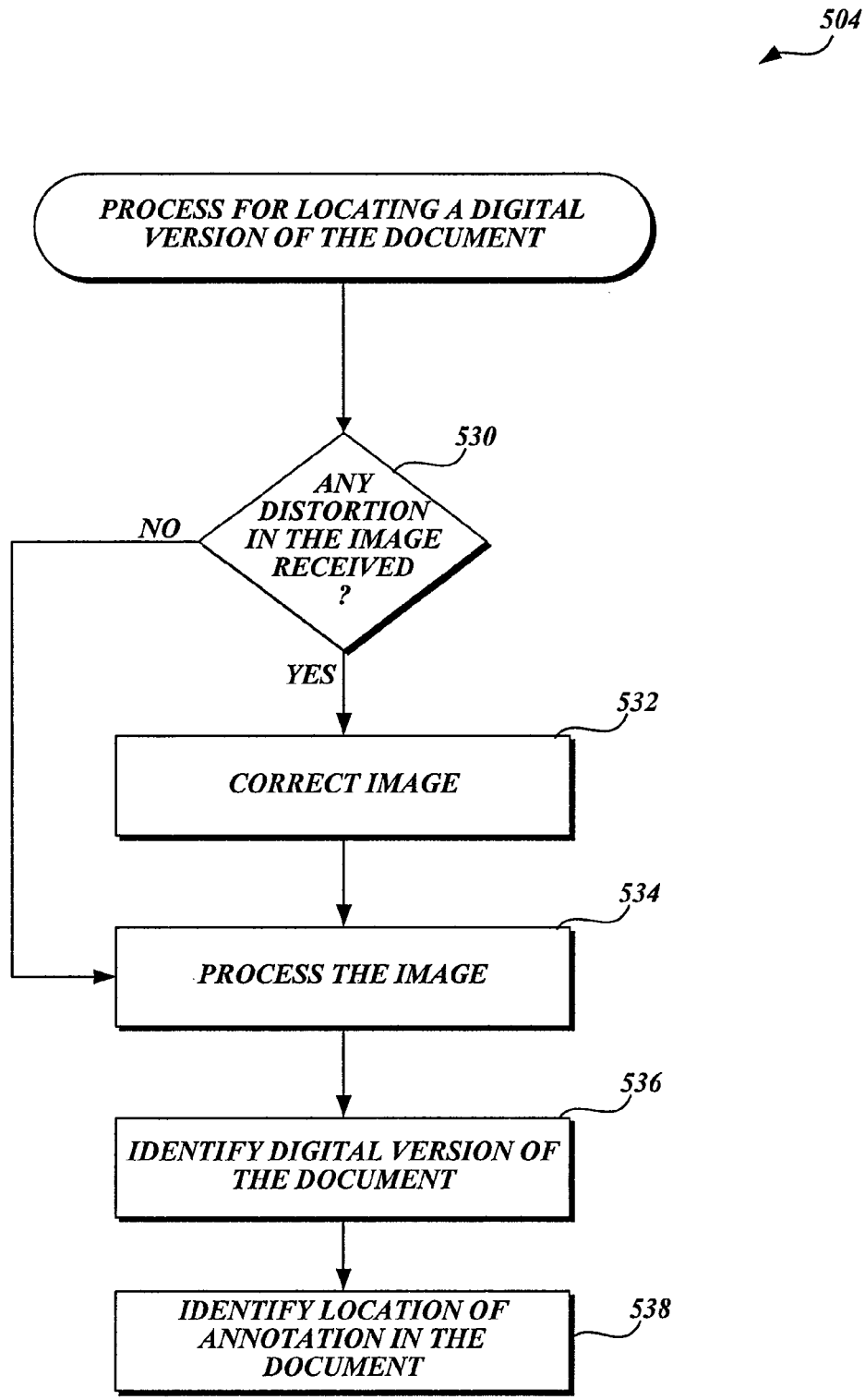

FIGS. 5A-5C illustrate one exemplary implementation of a process 500 for correlating an annotation on a paper version of a document with a digital version of the document. The process 500 is described with reference to the systems and programs illustrated in FIGS. 1-4. Briefly stated, the process 500 receives from an electronic input device 102 an image of human-comprehensible content in a document that is sufficient to identify the document and possibly a location in the document. The process 500 uses the data to locate a digital version of the document in the digital works database 108. Upon locating a digital version of the document, the process 500 further identifies the location of the annotation in the digital version of the document. The location of the annotation may be associated with any aspect of the document, including but not limited to the front or back of the document or a section, chapter, page, paragraph, sentence, phrase, word, character, etc. in the document. The process 500 then stores the annotation in the annotation database 110.

As noted above with reference to FIG. 2, in some embodiments of the invention, the electronic input device 102 records images of comprehensible content in a document and uploads the images to the server system 104, as indicated at block 502. The process 500 executes a routine 504 to locate a digital version of the document in the digital works database 110, using the received images. FIG. 5C illustrates one exemplary implementation of the routine 504 and will be discussed in detail below.

After executing the routine 504, the process 500 determines whether a digital version of the document has been found, as indicated at decision block 506. If the process 500 has not been able to locate a digital version of the document using the received image(s), the process 500 proceeds to check if it has received additional images containing comprehensible content from the electronic input device 102. See decision block 508. If the answer is YES, the process 500 loops back to the routine 504 to search for a digital version of the document using the additional images. If the process 500 does not receive additional images from the electronic input device 102, the process 500 proceeds to receive and store the annotation from the electronic input device 102. See block 509. A digital version of the document may be identified later, by manual or automatic searching and matching.

If the answer to decision block 506 is YES, the process 500 has successfully located a digital version of the document, and proceeds at continuation terminal A (FIG. 5B) to identify the location of the annotation in the digital version of the document. See block 510. In some embodiments of the invention, the process 500 may also send a notification to the electronic input device 102, acknowledging the successful identification of a digital version of the document that the user is annotating, as indicated at block 512. For example, the electronic input device 102 may emit a beep upon receiving the notification from the server system 104. At that moment, the electronic input device 102 may stop transmitting images used for purposes of identifying the digital version of the document, though additional images containing one or more annotations on the paper version of the document may be sent to the server system 104.

At block 514, the process 500 receives the annotation and proceeds to process the annotation, as indicated at block 516. As noted above, the annotation can be (or include) an executable instruction concerning the document. Such an instruction can be, for example, to look up a certain phrase or word in the document, to locate annotations made by other users, to locate annotations concerning a certain subject matter in the document, to print an object in the document, to execute an action on a remote system, etc. Typically, an annotation containing an instruction starts with a one or more predefined characters or words that can be recognized as indicating an executable instruction. Upon identifying such an annotation with an instruction, the process 500 executes the instruction contained in the annotation. Alternatively, the process 500 may trigger a new process to execute the instruction.

Part of processing the annotation at block 516 may include storing the annotation in the annotation database 110. In some embodiments of the invention, the process 500 receives and stores the annotation as an image file. In other embodiments, the process 500 processes the annotation using a standard character recognition process that converts the annotation into text, and stores the annotation as a text file. A text file may also be used to store the annotation when the annotation is received in text format from the user (e.g., using a keyboard). Alternatively, in the case that the annotation was dictated by the user and captured by the audio device 201 in the electronic input device 102, the annotation can be saved as an audio file.

In some embodiments of the invention, the process 500 augments a digital version of the document with the annotation, as indicated at block 518. When augmenting a digital version of a document with an annotation, the process 500 may cause the annotation to appear in the digital version of the document at approximately the same location as the annotation appeared on the paper version of the document, otherwise referred to herein as in-line insertion. In other embodiments, the process 500 may cause the annotation to appear as a footnote to the digital version of the document on the page where the annotation is located, at the end of the document, or on a separate page. If desired, a footnote indicator may appear in the digital version of the document at approximately the same location that the annotation appeared on the paper version of the document. The annotation may be presented in a graphic format (typically as an image of handwriting) or in a text format (which may be the result of applying OCR technology to a handwritten annotation or input received from a device such as a keyboard). A handwritten annotation may be displayed just as it is received from the electronic input device 102. The process 500 may then send the augmented document to an output device, such as the output device 112 illustrated in FIG. 1, as indicated at block 520. It should be understood, in the context of the invention, the terms "text" and "character" include all forms of letters, characters, symbols, numbers, formulae, etc., that may be used to represent information on a paper version of a document. The term "page" broadly refers to any space of two dimensions or greater in which content may reside.

FIG. 5C illustrates one exemplary implementation of the routine 504 referenced in FIG. 5A for locating a digital version of a document. The routine 504 implements aspects of the correlation program 316 illustrated in FIG. 4. Upon receiving an image from the electronic input device 102, the routine 504 first checks at decision block 530 if there is any distortion in the image received. If there is distortion in the image, the routine 504 proceeds to block 532 to correct the image using an image correction module, such as the image correction module 402 illustrated in FIG. 4 and described above. In a case where there is no distortion in the image or if the distortion has been corrected (or if no distortion correction is available or desired), the routine 504 proceeds to block 534 to process the image. When processing the image, the routine 504 may perform a character recognition process on the image. As described above, with respect to the character recognition module 404 illustrated in FIG. 4, a character recognition process converts characters in an image to electronic text. Examples of commercially-available optical character recognition software include OmniPage Pro from ScanSoft, Inc., and FineReader from SmartLink Corporation.

The routine 504 then proceeds to block 536 to locate a digital version of the document using the human-comprehensible content in the document. In some embodiments of the invention, one or more types of computer-implemented matching may be used to identify a digital version of the document. Such computer-implemented matching can include text matching using text resulting from performing character recognition on the received image. Alternatively, in other embodiments, signature matching using a digital signature derived from the received image may be used to identify a digital version of the document.

For example, using one or more strings of text (i.e., a collection of one or more characters) from the document obtained via the character recognition process, the server system 104 may search a database of content of known source for strings of content that match. In this example, the server system 104 may compare some or all of the text obtained from the printed document with digital text stored in the digital works database 108. If matching text is found in the digital works database 108 to uniquely correlate the image of comprehensible content with content of a known source, the identity of the digital version of the document is known. Similar matching algorithms may be employed where document is an audio or video work and the "image" received from the electronic input device 102 is a segment of audio or video. The server system 104 may compare the segment of audio or video, or some transformation thereof, with a digital works database of known content in order to find content that matches the input segment. If matching content is identified, the identity of the digital version of the document is known.

Other forms of computer-implemented matching may be used in embodiments of the invention. For example, rather than using a string of text to search the digital works database 108, the image of the document may itself be used to generate a digital signature that is then compared to digital signatures of content of known source. As will be seen below, optical character recognition may or may not be needed in such embodiments.

In one embodiment, a digital signature is generated from an image of a document by quantifying one or more characteristics of the image. Characteristics such as the amount of white space existing on a page, the distance between lines of printed text, the number of characters, words, or ink marks on the page or in a segment of the text in the page, or the placement of graphics in text or in the page, may all be used, either individually or collectively, to generate a digital signature that represents the image. Signal information in an image may also be transformed to another domain, such as a frequency domain, to generate a digital signature that represents the image.

Once a digital signature is generated from the image of the document, the digital version of the document may be identified by searching a repository of digital signatures generated from digital works of known source using the same process as employed on the received image. A matching digital signature results in identification of the digital version of the imaged document. Some caution should be exercised however when generating and comparing digital signatures of images with distortions from faxing, scanning, multi-generation copying, inconsistent lighting or shadowing, or other skewing that may change or degrade the quality of an image of content.

In yet another embodiment, a digital signature may be obtained using a hash function that operates on a subset of the comprehensible content, such as text, obtained from an image of a document. The hash function produces a hash key (sometimes referred to as a hash value). As known to those skilled in the art, hash functions can be used to represent a large amount of data with a smaller range of data, and are particularly suitable for fast searching. In accordance with one exemplary embodiment, a hash key for a page of printed content may be generated using digital text contained within predetermined fields on the page. For example, the first character of each line of text in a page and the length of the first word in each line may be combined to form a hash key. In another example, a hash key may be generated using a hash function that identifies the first character in one or more lines of text and combines it with the number of "ink marks" or strokes used in the first word, including punctuation, in each line of text.

Multiple hash keys for an image of a document may also be derived and used for searching the digital works database 108 to identify the digital version of the document. For example, a hash function could be employed on portions of text occurring at the top and bottom and left and right corners of the text. Having multiple hash keys for a document image is useful in cases where part of an image received from the electronic input device 102 is obscured or distorted. A hash function operating on text in an unobscured or undistorted portion of the image may be used to generate a suitable hash key that identifies the digital version of the document when a matching hash key is found in the digital works database 108. In these examples, the optical character recognition process is not necessarily performed on an entire image of a document nor is an image containing an entire page of a document required.

After identifying the digital version of the document, the routine 504 may also identify the location of the annotation in the document, as indicated at block 538, for later display of the annotation with the digital version of the document. In one exemplary implementation, the routine 504 may incorporate data obtained from the character recognition process indicating the relative location of text identified in the image received from the electronic input device 102. OCR software is capable of recording X-Y positions of text identified in an image. One or more segments of identified text adjacent to an annotation in the image may be selected by the routine 504. The digital version of the document is analyzed and the location of these segments in the digital version of the document is determined. Since the selected segments were adjacent to (or under) the annotation, the location of the annotation in the digital version of the document is known. This location information can be stored with the annotation in the annotations database 110. One or more distances may also be calculated between the selected segments and the annotation itself. The additional distance information can be used to position the annotation more precisely with the digital version of the work when augmenting the digital work with the annotation at a later time.

Returning to block 536 described above, OCR text position data can also be used to identify the digital version of the document. Segments of text identified in an image received from the electronic input device 102, and the relative distance between the segments, can be determined to form a unique digital signature. Documents of known identity in the digital works database 108 (stored with text position data possibly obtained by the same OCR process run earlier on the known documents) are analyzed to see if any one of them contains the same segments of text having the same spatial relationship among them. When a document is found with the same segments of text having the same spatial relationship among them (i.e., a matching digital signature), the identity of the document is known.

Alternatively, as noted above with reference to FIG. 2, in some embodiments of the invention, the electronic input device 102 processes the image of the human-comprehensible content to generate data such as a hash key or a digital signature concerning the human-comprehensible content. In these embodiments, the electronic input device 102 may generate a hash key or digital signature by using the same or similar hash key and digital signature generation procedures described above. Upon receiving such data, the process 500 may use the one or more types of computer-implemented matching described above to identify a digital version of the document and the location of the annotation in the digital version of the document.

Figure 6:
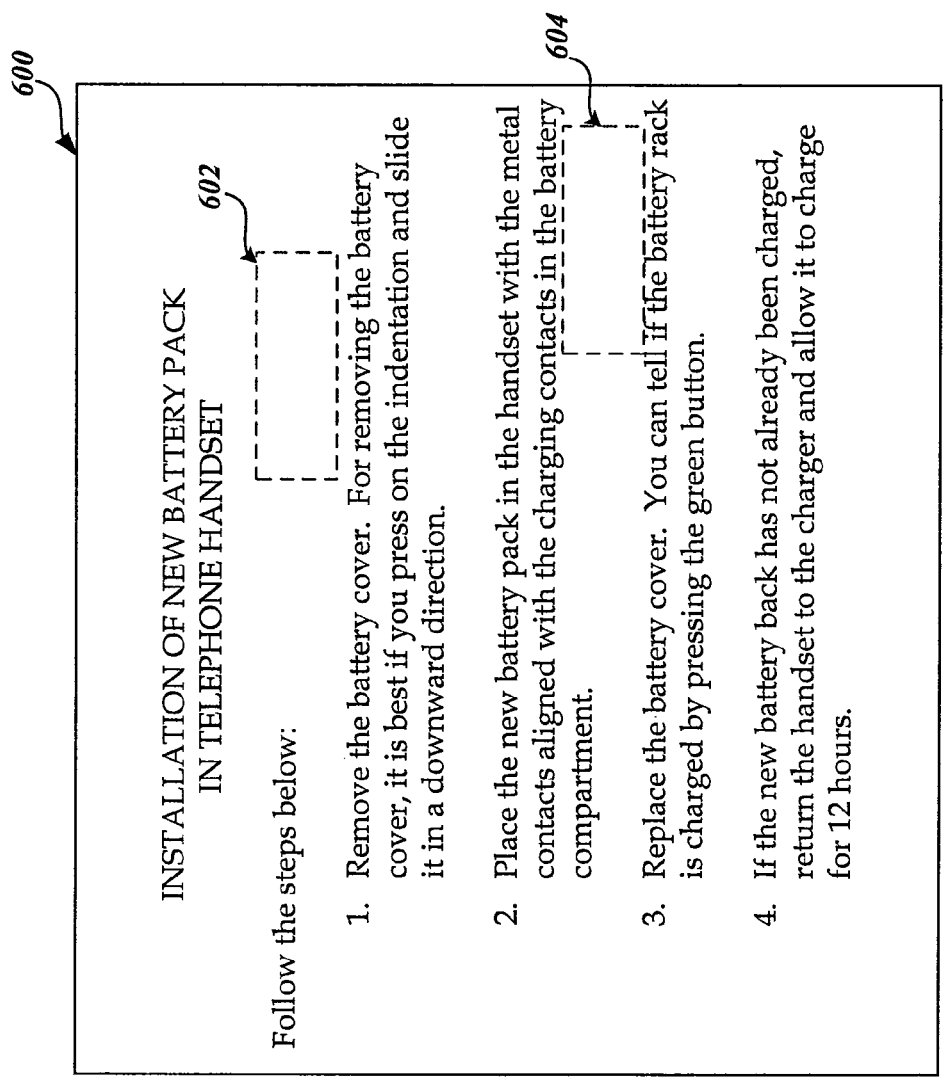
FIG. 6 is a pictorial diagram illustrating one exemplary implementation of augmenting a digital work with one or more annotations.
Figure 7:
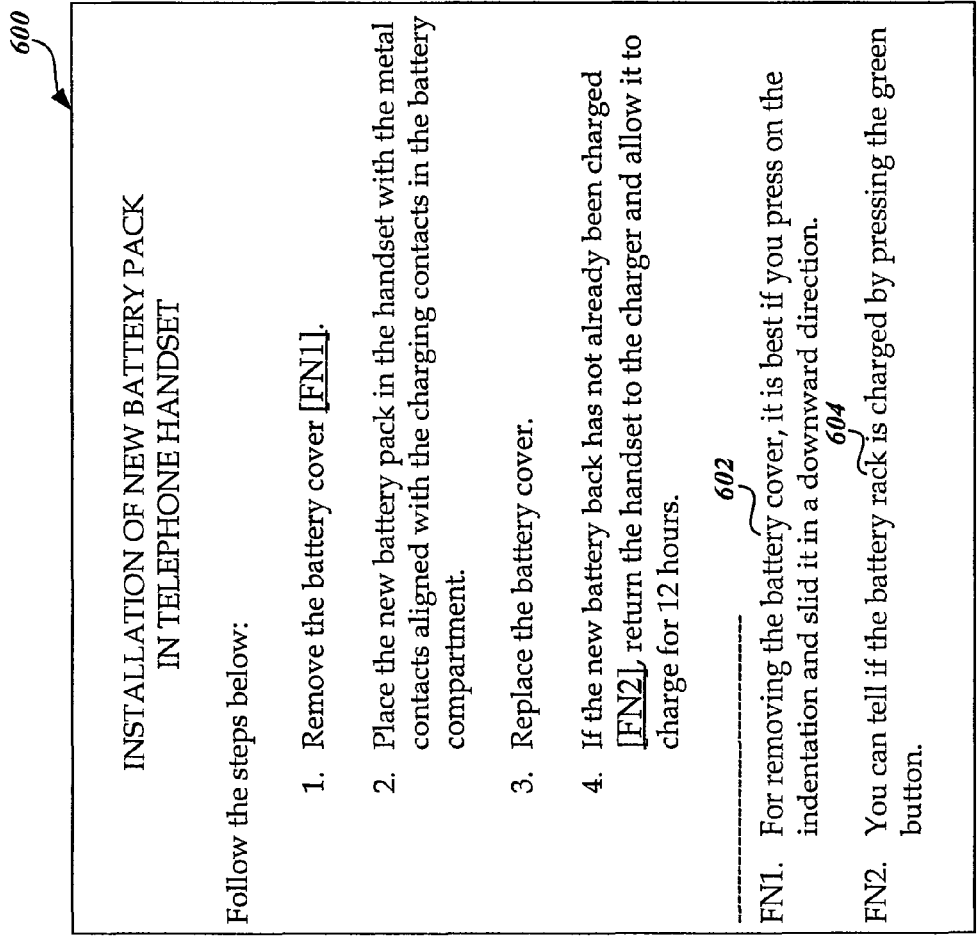
FIG. 7 is a pictorial diagram illustrating an alternative implementation of augmenting a digital work with one or more annotations.

As for augmenting and presenting the digital version of the document with stored annotations, as previously described, the annotation may appear in the digital version of the document at approximately the same location where the annotation appeared on the paper version of the document. In one embodiment, a layered display may be used to create this effect where the digital work (without annotation) is displayed and the annotation is displayed on another layer superposed over the layer with the digital work. Alternatively, the data forming an image of the digital work (e.g., bit map or vector data) may be modified to incorporate the data representing the annotation, with the modified digital work then being provided for display. FIG. 6 illustrates a digital version of a document 600 where annotations 602 and 604 have been caused to appear "in-line" at the location where they appeared on the paper version of the document 600. The annotations 602 and 604 may be inserted as image components or textual components. In other embodiments, annotations may be added to the digital version of the document as footnotes. FIG. 7 illustrates one example of a digital version of the document 600, wherein the annotations 602 and 604 are appended to the digital work 600 as footnote 1 and footnote 2. Footnote indicators (here shown as FN1 and FN2) may be inserted as image or textual components in the display of the digital work to show where the annotations appeared in the paper version of the document.

While several embodiments of the invention have been illustrated and described, it will be appreciated that various changes can be made therein without departing from the spirit and scope of the invention. The scope of the invention, therefore, should be determined from the following claims and equivalents thereto.

While illustrative embodiments have been illustrated and described, it will be appreciated that various changes can be made therein without departing from the spirit and scope of the invention.

The embodiments of the invention in which an exclusive property or privilege is claimed are defined as follows:

1. An electronic input device comprising:
    a recording component configured to electronically record an annotation made by a user to a document;
    a recognition component configured to analyze the annotation made by the user and determine whether the annotation includes an electronically-executable instruction; and
    a processing component configured to automatically cause an execution of the electronically-executable instruction when the annotation made by the user is determined to include an electronically-executable instruction.

2. The electronic input device of claim 1, wherein the recognition component is configured to recognize an electronically executable instruction in the annotation based on one or more predefined characters in the annotation that indicate an electronically-executable instruction.

3. The electronic input device of claim 1, wherein the electronic input device is configured to locally execute the electronically-executable instruction.

4. The electronic input device of claim 1, wherein the electronic input device is configured to communicate the electronically-executable instruction to a separate device for remote execution.

5. The electronic input device of claim 4, wherein the electronically-executable instruction specifies the separate device, and wherein the recognition component is configured to identify the separate device from the electronically-executable instruction.

6. The electronic input device of claim 1, wherein the document is a physical paper document and the recording component is configured to electronically record an annotation of the physical paper document.

7. The electronic input device of claim 1, wherein execution of the electronically executable instruction initiates a search of a digital version of the document for one or more words.

8. The electronic input device of claim 1, wherein execution of the electronically executable instruction initiates a search of a digital version of the document for one or more annotations.

9. The electronic input device of claim 1, wherein execution of the electronically executable instruction causes at least a portion of a digital version of the document to be printed.

10. The electronic input device of claim 1, wherein execution of the electronically executable instruction causes an e-mail to be generated.

11. The electronic input device of claim 10, wherein execution of the electronically executable instruction causes a digital version of the annotated document to be attached to the e-mail.

12. A computer-implemented method comprising:
    under control of instructions that are executed by one or more computing devices in a computer system:
    obtaining an electronic version of an annotation made to a physical version of a document;
    determining if the annotation to the physical version of the document includes an electronically-executable instruction; and
    automatically causing an execution of the electronically-executable instruction if the annotation to the physical version of the document includes an electronically-executable instruction.

13. The method of claim 12, wherein execution of the electronically executable instruction causes at least a portion of a digital version of the document to be printed.

14. The method of claim 12, wherein execution of the electronically executable instruction causes an e-mail to be generated with a digital version of the annotated document attached.

15. The method of claim 12, wherein execution of the electronically executable instruction initiates a search of a digital version of the document for one or more words.

16. The method of claim 12, wherein execution of the electronically executable instruction initiates a search of a digital version of the document for one or more annotations.

17. A computer-readable medium containing executable instructions that, when executed by a computing apparatus, cause the computing apparatus to:
    obtain an electronic version of an annotation of a document made to a physical version of the document;
    identify an electronically-executable instruction in the annotation made to the physical version of the document; and
    automatically cause an execution of the electronically-executable instruction.

18. The computer readable medium of claim 17, wherein the electronically executable instruction is identified in the annotation based on one or more predefined characters in the annotation that indicate an electronically executable instruction.

19. The computer readable medium of claim 17, wherein the instructions stored on the computer-readable medium further cause the computing apparatus to identify a separate computing device that is specified in the annotation, and to communicate the electronically-executable instruction to the separate computing device for remote execution.

20. The computer readable medium of claim 17, wherein the instructions stored on the computer-readable medium cause the computing apparatus to locally execute the electronically-executable instruction.

* * * * *